T. J. MORRIS.
PIPE HANGER.
APPLICATION FILED JUNE 10, 1915.

1,291,079.

Patented Jan. 14, 1919.

INVENTOR.

Thomas J. Morris

UNITED STATES PATENT OFFICE.

THOMAS J. MORRIS, OF SPRINGFIELD, MASSACHUSETTS.

PIPE-HANGER.

1,291,079.

Specification of Letters Patent.   Patented Jan. 14, 1919.

Application filed June 10, 1915.   Serial No. 33,314.

*To all whom it may concern:*

Be it known that I, THOMAS J. MORRIS, a citizen of the United States, residing at Springfield, in the county of Hampden and State of Massachusetts, have invented new and useful Improvements in Pipe-Hangers, of which the following is a specification.

My invention relates to means for supporting water, steam, or other pipe from a ceiling or other overhead support.

It has for its object the providing of a simple and inexpensive form of hanger for supporting pipe of various sizes and especially large and heavy piping, subject to longitudinal expansion and contraction, and also the providing of a pipe hanger which may be readily taken apart in one or more ways to permit the ready insertion or removal of the pipe, and a hanger which may be readily adjusted.

In the accompanying drawings in which like letters of reference indicate like parts, Figure 1 is a side view of the hanger.

The construction and operation of my device will be readily understood on reference to the drawings in connection herewith.

The hanger comprises a yoke having the top part $a$ and depending arms $b$. These arms are provided at their lower ends with the hook portions $c$. The pipe supporting roller $d$ is provided with the portions $e$ of less diameter than the body portion of a size to rest within the hook portions $c$ of the yoke, and to provide against danger of the roller slipping out of place by reason of the spreading of the arms $b$, or by reason of imperfect construction, I provide the roller with the enlarged portions $f$ at each end. The roller is longitudinally curved to fit the size of pipe as the same may be employed with. It will readily be seen that by changing the roller the remainder of the hanger may be employed for different sizes of pipe and the pipe in each instance be given support over a considerable area.

While various means for supporting the hanger may be employed I prefer to provide a lag-screw or supporting bolt $g$ adapted at its upper portion to be screwed into a timber and with its lower or remaining portion provided with a machine thread, upon which are mounted the threaded nuts $h$ and $i$ so that the hanger may be adjusted vertically by turning the lag screw $g$ to a greater or lesser extent and also by moving the nut $i$ on the straight portion of the lag screw, thus raising or lowering the yoke, the nut $h$ being employed to maintain the hanger firmly in position on the lag screw $g$ and prevent vertical movement of the yoke when the pipe and roller are placed in position.

Figure 1:
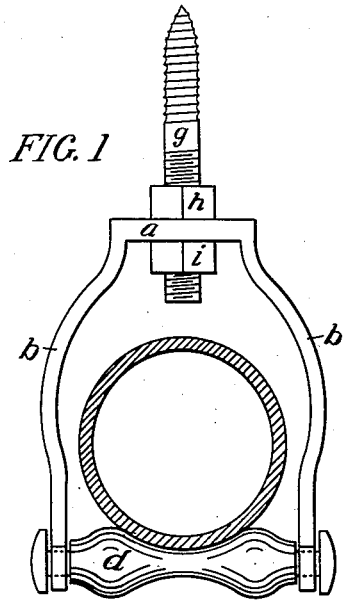
Figure 2:
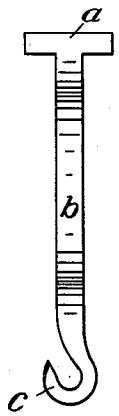
Fig. 2 is an edge view of the yoke of the hanger.
Figure 4:
Fig. 4 is a plan view of the yoke as seen from the top, the side arms being broken away.
Figure 3:
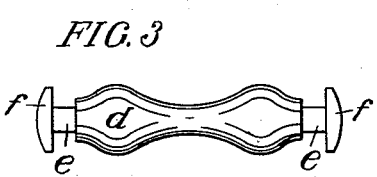
Fig. 3 is a view of the supporting roll detached from the yoke.
Figure 5:
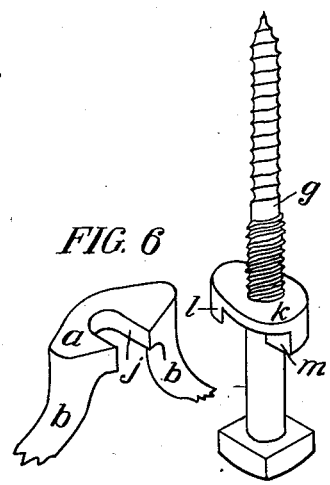
Fig. 5 is a perspective view of a modification showing a supporting bolt and lock-nut.
Figure 6:
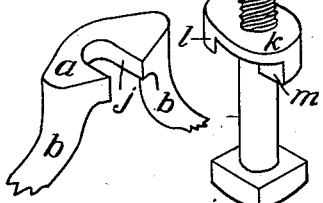
Fig. 6 is a perspective view of the top portion of the yoke in modified form.

As a modification and in order to enable me to detach the yoke from the supporting member without turning the nut to any appreciable extent I show in Fig. 5 a construction wherein the top portion $a$ of the yoke is provided with a lateral opening $j$ of a size sufficient to receive the body of the lag screw $g$ and to prevent lateral displacement I provide a member $k$ having an overhanging part $l$ which depends from the member $k$ below the upper surface of the part $a$ and prevents movement of the part $k$ in the direction of the open slot $j$. I also provide the part $k$ with the depending lug $m$, which rests within the recess $j$ and thus the whole is held firmly in position when the lag screw is turned up so that its head or a nut as before referred to, bears against the under surface of the part $a$. It will readily be seen that the part $k$ may be threaded to engage threads on the lag screw $g$ or that the opening in the part $k$ may be sufficiently large to slide over the threaded portion of the lag screw $g$ and that nuts may be employed as hereinbefore explained.

It will readily be seen that various features may be modified to a considerable extent without departing from my invention.

Having therefore described my invention, what I claim as new and desire to secure by Letters Patent, is,—

A pipe hanger comprising a yoke having a lateral slot in its top portion, a member as $k$ adapted to receive a supporting bolt and provided with a depending member as $l$ to prevent lateral movement of the member $k$ until the member $k$ is moved vertically from its normal position.

THOMAS J. MORRIS.